J. REINHART.
FLY TRAP.
APPLICATION FILED DEC. 5, 1913.

1,159,273.

Patented Nov. 2, 1915.

Witnesses
Inventor
John Reinhart,
By
his Attorney

UNITED STATES PATENT OFFICE.

JOHN REINHART, OF EARLY, IOWA.

FLY-TRAP.

1,159,273.　　　Specification of Letters Patent.　　Patented Nov. 2, 1915.

Application filed December 5, 1913. Serial No. 804,924.

*To all whom it may concern:*

Be it known that I, JOHN REINHART, a citizen of the United States, residing at Early in the county of Sac and State of Iowa, have invented certain new and useful Improvements in Fly-Traps, of which the following is a specification.

My invention relates to traps and more particularly to a device for catching flies.

The primary object of my invention is to provide an improved means for releasably supporting the door of a trap in an operative position.

Another object of my invention is to provide an improved means on the door of a trap which will facilitate the trapping of the flies.

A further object of my invention is to provide a device that is simple in construction, efficient in operation, and one that can be manufactured and placed upon the market at a minimum cost.

Other objects as well as the nature, characteristic features, and scope of my invention will be clear from the following description taken in connection with the accompanying drawings.

Figure 1:
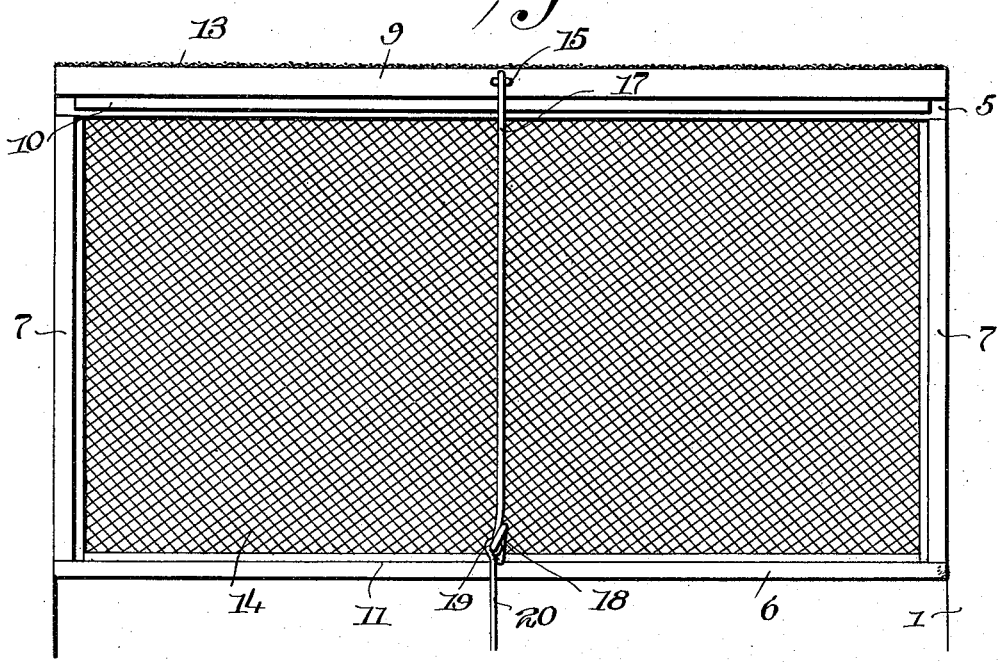
Figure 2:
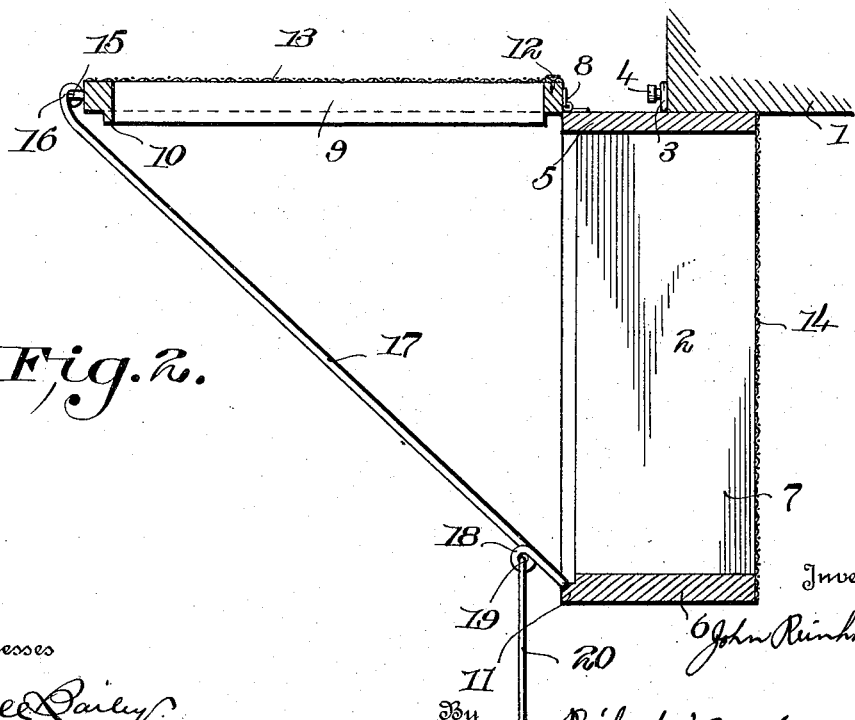

In the drawings: Figure 1, is a front, elevational view of my invention showing the trap in operative position attached to the jamb of a door. Fig. 2, is a transverse-sectional view of the same.

Referring more particularly to the drawings in which similar reference numerals designate like or corresponding parts, the numeral 1, designates the jamb of a door, to the upper inner end of which is detachably secured my improved trap 2, by means of eyes or the like 3, secured to the top of the trap and engaged upon nails or the like 4, carried by the jamb. The trap in this instance consists essentially of an oblong frame comprising a top-piece 5, a bottom piece 6, an end piece 7, and to which top piece 5, is pivotally secured, preferably by hinges 8, a door 9, having offset portions 10, which are adapted to engage the reduced portions 11, on the inner edges of the bottom piece 6, and the end piece 7, and which reduced portions constitute a seat for the offset portions 10. In order to effect a closure for the trap I have secured to the front of the door and the back of the frame in any suitable manner, preferably by tacks or the like 12, reticulated means comprising pieces of wire screening 13 and 14.

Engaged in the eye or the like 15, in the bottom of the door 9, is the looped end 16, of a rod 17, the lower end of which rod is adapted to rest upon the reduced portion in the bottom piece 6, and support the door in a substantially horizontal position. The rod 17, is coiled upon itself adjacent its free end as at 18, and in which coil is engaged the looped end 19 of an operating rod 20.

The operation of my device is as follows: When a sufficient quantity of flies have accumulated in the frame, the door 9, being supported by the supporting rod 17, which rests on the bottom of a frame is released by a slight pull on the operating rod 20 and the offset portions 10 of the door engage the reduced portions 11, on the frame and prevent the escape of the flies.

It must be noted that the reticulated means on the door and frame will not fan the flies when the door has been released and thus facilitates the trapping of the same.

It will be obvious to those skilled in the art to which this invention relates that modifications may be made in detail without departing from the spirit or scope of my invention.

Having thus fully described my invention what I claim as new and desire to secure by Letters Patent is:

1. In a fly trap, a substantially oblong frame, a reticulated means secured to the back of the frame, a door pivotally secured to the upper front edge of said frame opposite said reticulated means, a reticulated means secured to said door, a rod for releasably holding said door in a horizontal position having one end secured to the bottom of the door and the opposite end resting upon the outer edge of the bottom of said frame, and means for moving said rod to allow the door to engage the outer edge of the bottom of the frame and close the frame.

2. In a fly trap, a substantially oblong frame, a piece of screening secured to the back of said frame, a door hingedly secured to the top of the front of said frame, a piece of screening secured to the front of said door, a rod, the one end of which is looped and engaged upon the bottom of said door and the opposite end of which rests upon the bottom of said frame, said rod releasably supporting said door in a horizontal position, said rod being coiled adjacent its free end, and an operating member engaged in said coil for actuating said supporting rod.

In testimony whereof I affix my signature in presence of two witnesses.

JOHN REINHART.

Witnesses:
W. W. LITTLE,
R. E. BROWN.

Copies of this patent may be obtained for five cents each, by addressing the "Commissioner of Patents, Washington, D. C."